(12) United States Patent
Vashi et al.

(10) Patent No.: US 12,342,323 B2
(45) Date of Patent: Jun. 24, 2025

(54) DYNAMICALLY ALLOCATING NETWORK RESOURCES FOR EXCHANGING DATA USING WIRELESS NETWORKS

(71) Applicant: Apple Inc., Cupertino, CA (US)

(72) Inventors: Prashant H. Vashi, San Jose, CA (US); Muthukumaran Dhanapal, San Diego, CA (US); Zhenglian Cai, Cupertino, CA (US); Ioannis Pefkianakis, San Jose, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 17/946,522

(22) Filed: Sep. 16, 2022

(65) Prior Publication Data

US 2023/0086297 A1 Mar. 23, 2023

Related U.S. Application Data

(60) Provisional application No. 63/247,798, filed on Sep. 23, 2021.

(51) Int. Cl.
*H04W 28/02* (2009.01)
*H04L 5/00* (2006.01)
*H04W 72/02* (2009.01)

(52) U.S. Cl.
CPC ............ *H04W 72/02* (2013.01); *H04L 5/001* (2013.01)

(58) Field of Classification Search
CPC ..... H04W 24/08; H04W 72/02; H04W 16/10; H04W 24/02; H04W 24/10; H04W 36/32; H04L 5/001; H04L 65/61
See application file for complete search history.

(56) References Cited

U.S. PATENT DOCUMENTS

2019/0312702 A1\* 10/2019 Yan ................. H04L 5/0094
2021/0410103 A1\* 12/2021 Zhang ............... H04W 92/18

OTHER PUBLICATIONS

[Unknown Author], "3rd Generation Partnership Project; Technical Specification Group Radio Access Network; NR; Radio Resource Control (RRC) protocol specification (Release 15), "3GPP TS 38.331 V15.14.0, Jun. 2021, 540 pages.

\* cited by examiner

*Primary Examiner* — Phuoc H Doan
(74) *Attorney, Agent, or Firm* — Fish & Richardson P.C.

(57) ABSTRACT

In an example method, a first device determines first network resources that have been activated for exchanging data with one or more second devices via a wireless network, and determines, for each of the first network resources, a time duration of a respective burst transmission performed using that first network resource. The first device determines whether to (i) activate second network resources for exchanging data with the second devices and/or (ii) deactivate one or more of the first network resources for exchanging data with the second devices. In response, the first device activates the second network resources and/or deactivates the one or more of the first network resources.

20 Claims, 6 Drawing Sheets

DYNAMICALLY ALLOCATING NETWORK RESOURCES FOR EXCHANGING DATA USING WIRELESS NETWORKS

TECHNICAL FIELD

The disclosure relates to systems and techniques for dynamically allocating network resources for exchanging data using wireless networks.

BACKGROUND

Electronic devices can communicate with one another through a wireless network. As an example, a first electronic device can establish a wireless communications link, such as a cellular link, with a second electronic device. The first electronic device can transmit data to and/or receive data from the second electronic device via the wireless communications link.

SUMMARY

Systems, methods, devices and non-transitory, computer-readable media are disclosed for dynamically allocating network resources for exchanging data using wireless networks.

In some aspects, a method includes determining, by a first device, a plurality of first network resources that have been activated for exchanging data between the first device and one or more second devices via a wireless network; determining, by the first device, and for each of the first network resources, a time duration of a respective burst transmission performed using that first network resource; and determining, by the first device, and based on the time durations, whether to execute at least one of: (i) activating one or more second network resources for exchanging data between the first device and the one or more second devices via the wireless network, or (ii) deactivating one or more of the first network resources for exchanging data between the first device and the one or more second devices via the wireless network; and at least one of activating the one or more second network resources or deactivating the one or more of the first network resources for exchanging data between the first device and the one or more second devices via the wireless network.

Implementations of these aspects can include one or more of the following features.

In some implementations, the first device can include a user equipment (UE) of the wireless network. Further, each of the one or more second devices can include a respective base station (BS) of the wireless network.

In some implementations, the first network resources and the one or more second network resources can include a plurality of carrier components (CCs) for exchanging data via the wireless network.

In some implementations, determining whether to execute at least one of (i) activating the one or more second network resources, or (ii) deactivating the one or more of the first network resources can include: determining, based on the time durations: a first count of the first network resources that satisfy one or more saturation criteria, and a second count of the first network resources that do not satisfy the one or more saturation criteria.

In some implementations, for each of the first network resources, determining whether that first network resources satisfies the one more saturation criteria can include determining whether the time duration of the burst transmission performed using that first network resource exceeds a threshold time duration.

In some implementations, the one or more second network resources can be activated based on a determination that the first count is greater than or equal to a threshold value N.

In some implementations, the threshold value N can be equal to a number of the first network resources.

In some implementations, the threshold value N can be less than a number of the first network resources.

In some implementations, activating the one or more second network resources can include: determining, for each of a plurality of candidate network resources, a corresponding quality metric for that candidate network resource; and selecting the one or more second network resources from the plurality of candidate network resources based on the quality metrics.

In some implementations, for each of the candidate network resources, the quality metric of that candidate network resource can represent at least one of: a reference signal received power (RSRP) associated with that candidate network resource, a signal to noise ratio (SNR) associated with that candidate network resource, or a channel quality indicator (CQI) associated with that candidate network resource.

In some implementations, the one or more first network resources can be deactivated based on a determination that the second count is greater than or equal to a threshold value M.

In some implementations, deactivating the one or more first network resources can include determining, for each of the first network resources, a corresponding quality metric for that first network resource; and selecting the one or more first network resources based on the quality metrics.

In some implementations, for each of the one or more first network resources, the quality metric of that first network resource can represent at least one of: a reference signal received power (RSRP) associated with that first network resource, a signal to noise ratio (SNR) associated with that first network resource, or a channel quality indicator (CQI) associated with that first network resource.

Other implementations are directed to systems, devices and non-transitory, computer-readable media including computer-executable instructions for performing the techniques described herein.

Particular implementations provide at least the following advantages. In some cases, the implementations described herein can be used to exchange data between electronic device in a power efficient and network resource efficient manner.

As an example, electronic devices can exchange data with one another over a wireless network using corresponding sets of network resources, such as one or more carrier components of one or more frequency bands. In some implementations, an electronic device can utilize a greater amount of network resources (e.g., a greater number of carrier components) to exchange data more quickly and/or according to a lower latency (e.g., compared to the transmission of data using a lesser amount of network resources). However, in doing so, the electronic device may also consume a greater amount of computational resources and/or power (e.g., compared to the amount that would be consumed using a lesser amount of network resources). Accordingly, at least in some implementations, there may be a tradeoff between the speed and/or latency by which data is exchange, and the computational resources and/or power that may be consumed to perform the exchange.

Using the systems and techniques described herein, a system can dynamically allocate network resources for exchanging data between electronic devices. For instance, during periods of high network utilization by an electronic device, a system can selectively activate additional network resources (e.g., carrier components) for use by the electronic device in exchange data, such that the electronic device can exchange data quickly and/or according to a low latency. Further, during periods of low network utilization by the electronic device, a system can selectively deactivate network resources (e.g., carrier components) for use by the electronic device in exchange data, such that the electronic device can conserve computational resources and/or power. Accordingly, the electronic device can exchange data with other electronic devices in a power efficient and network resource efficient manner.

The details of one or more embodiments are set forth in the accompanying drawings and the description below. Other features and advantages will be apparent from the description and drawings, and from the claims.

DETAILED DESCRIPTION

Figure 1:
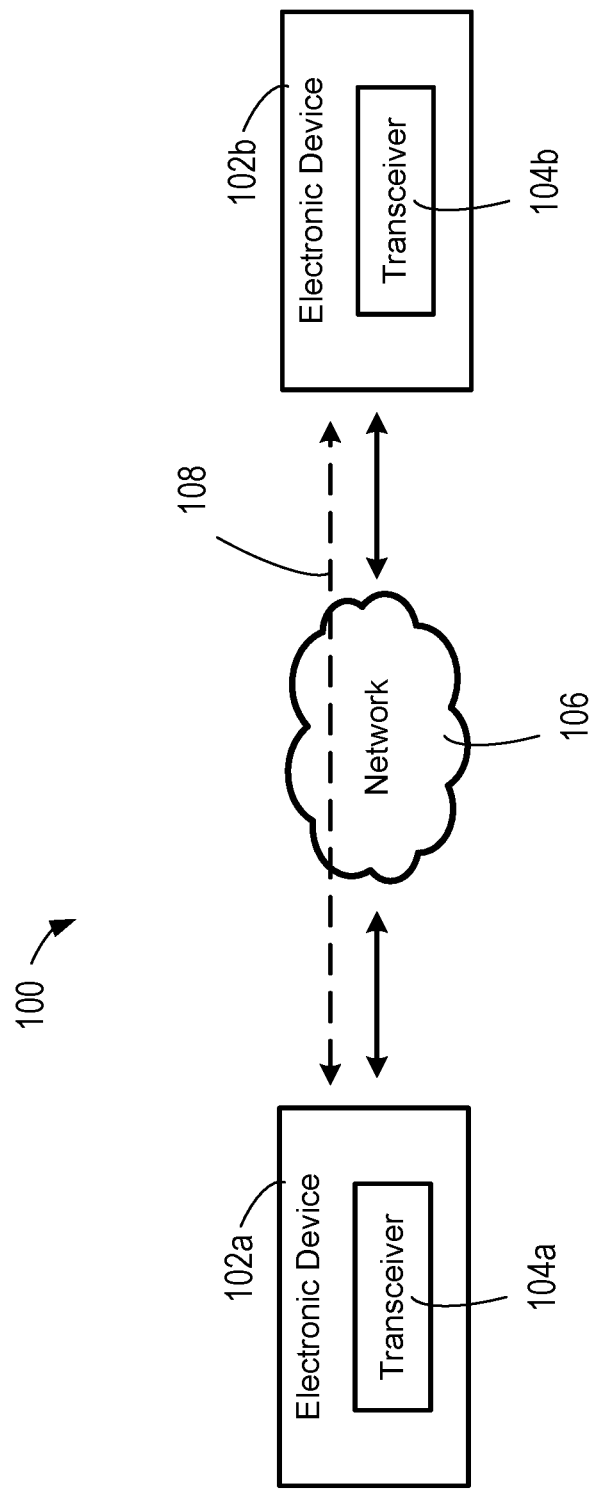
FIG. 1 is a diagram of an example system for exchanging data using a wireless network.

FIG. 1 shows an example system 100 for exchanging data using a wireless network. The system 100 includes a first electronic device 102a having a first wireless transceiver 104a, and a second electronic device 102b having a second wireless transceiver 104b.

In at least some implementations, the system 100 enables the electronic devices 102a and 102b to communicate with one another via one or more wireless communications links in a wireless network 106. Further, network resources can be dynamically allocated to the electronic devices 102a and 102b to facilitate the exchange of data using the wireless communications links. For instance, during periods of high network utilization by the electronic devices 102a and 102b, the system 100 can selectively activate additional network resources (e.g., carrier components of one or more frequency bands) for use by the electronic devices 102a and 102b in exchanging data, such that the electronic devices 102a and 102b can exchange data quickly and/or according to a low latency. Further, during periods of low network utilization by the electronic devices 102a and 102b, the system 100 can selectively deactivate network resources for use by the electronic devices 102a and 102b in exchanging data, such that the electronic devices 102a and 102b can conserve computational resources and/or power. Accordingly, the electronic devices 102a and 102b can exchange data with one another in a power efficient and network resource efficient manner.

As described above, the electronic devices 102a and 102b can communicate with one another via one or more wireless communications links in a wireless network 106. As an example, using their wireless transceivers 104a and 140b, the electronic devices 102a can establish a one or more wireless communications links 108 between them. Further, the electronic devices 102a and 102b can transmit data to and/or receive data from one another via the wireless communications links 108 (e.g., by encoding the data in one or more signals, transmitting the signals wirelessly according to one or more wireless communications protocols, and decoding the signals to extract the data).

In practice, the electronic devices 102a and 102b can be any devices that are configured to receive, process, and transmit data. As an example, at least one of the electronic devices 102a or 102b can be a computing device, such as a client computing device (e.g., a desktop computer or a notebook computer), a server computing device (e.g., a server computer or cloud computing system), a mobile computing device (e.g., a cellular phone, smartphone, a tablet, a personal data assistant, or a notebook computer), a wearable computing device (e.g., a smart watch, a virtual reality headset, or an augmented reality headset), or other computing device capable of receiving, processing, and transmitting data. In some implementations, at least one of the electronic devices 102a or 102b can operate using one or more operating systems (e.g., Apple macOS, Apple iOS, Microsoft Windows, Linux, Unix, Google Android, etc.) and one or more architectures (e.g., x86, PowerPC, ARM, etc.).

In some implementations, one of the electronic devices 102a and 102b can be a user equipment (UE) for communicating using the wireless network 106. A UE also may be referred to as a client device or mobile station). Further, another one of the electronic devices 102a and 102b can be a base station (BS) for the wireless network 106. A BS also may be referred to as a base transceiver station (BTS) or a network node.

The wireless transceivers 104a and 104b can be configured to establish wireless communications links 108 in the wireless network 106, and transmit and receive data via those wireless communications links 108 according to any wireless communications protocol. In some implementations, the wireless transceivers 104a and 104b can be implemented using the wireless communications subsystems 624 described with reference to FIG. 6. Example wireless communications protocols include cellular communications protocols, such as a Global System for Mobile (GSM) protocol, a code-division multiple access (CDMA) protocol, a push-to-talk (PTT) protocol, a push-to-talk over cellular (POC) protocol, a Universal Mobile Telecommunications System (UMTS) protocol, a 3rd Generation Partnership Project Long-Term Evolution (3GPP LTE) protocol, a Fifth Generation (5G) protocol, a New Radio (NR) protocol, and/or any other cellular communications protocol.

Although FIG. 1 shows each of the electronic devices 102a and 102b having a single respective wireless transceiver 104a or 104b, in practice, each of the electronic devices 102a and 102b can have any number of transceivers. Further, although FIG. 1 shows two example electronic devices 102a and 102b, in practice, a system 100 can include any number of electronic devices that are interconnected with another via one or more wireless networks.

As described above, network resources can be dynamically allocated to the electronic devices 102a and 102b to facilitate the exchange of data using the wireless communications links 108. In some implementations, network resources can include portions of one more or frequency bands that have been allocated for exchanging data using the wireless network 106. As an example, each frequency band can be divided into one or more carrier components (e.g., subsets of the frequency band), and one or more carriers components can be dynamically allocated to the electronic devices 102 and 102b to facilitate the transmission of data between them.

Figure 2A:
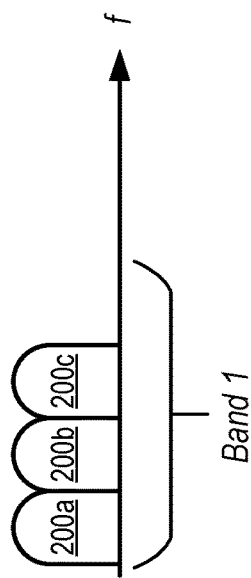
FIGS. 2A-2C are diagrams of example frequency bands and carrier components.

FIG. 2A shows simplified examples of frequency bands and their constituent carrier components.

As shown in FIG. 2A, in some implementations, a frequency band (e.g., "Band 1") can be divided into several constituent carrier components 200a-200c that are spectrally contiguous with one another (e.g., adjacent to one another in the frequency domain). In this configuration, the carrier components 200a-200c may be referred to as intra-band, contiguous carrier components.

Figure 2B:
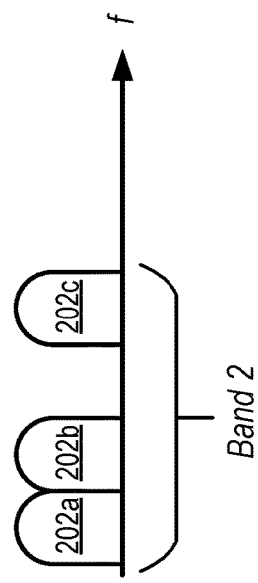

As shown in FIG. 2B, in some implementations, a frequency band (e.g., "Band 2") can be divided into several constituent carrier components 202a-202c, at least some of which are spectrally separated from others by one or more gaps in the frequency domain (e.g., one or more guard bands). In this configuration, the carrier components 202a-202c may be referred to as intra-band, non-contiguous carrier components.

Figure 2C:
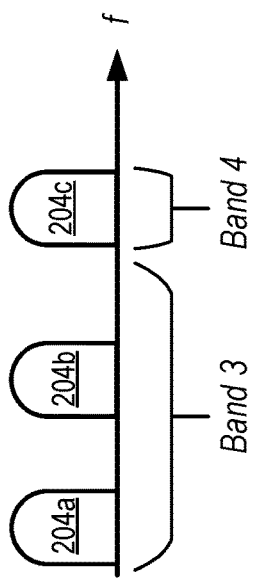

As shown in FIG. 2C, in some implementations, multiple frequency bands (e.g., "Band 3" and "Band 4") can be divided into several constituent carrier components 204a-204c. Further, at least some of the carrier components 204a-204c can be spectrally separated from others by a gap in the frequency domain. In this configuration, the carrier components 204a-204c may be referred to as inter-band, non-contiguous carrier components.

Although FIGS. 2A-2C show several example frequency bands and constituent carrier components, these are merely illustrative examples. In practice, a frequency band can be divided into any number of constituent carrier components (e.g., two, three, four, five, six, seven, either, or more). Further, in some implementations, a frequency band can include only a single constituent carrier component. Further still, the carrier components of a frequency band can be spectrally contiguous with one or more other carrier components and/or spectrally separated by one or more other carrier components by one or more gaps in the frequency domain.

In some implementations, the frequency bands and the carrier components can be specified in accordance with a cellular communications protocol and/or local licenses governing the use of a wireless spectrum. As an example, in a 5G cellular communications network, several frequency bands may be allocated for use in exchanging data using the network, including one or more of: (i) a frequency band n257 (often referred to as Local Multipoint Distribution Service (LMDS) band) having a center frequency of 28 GHz and spanning from 26.50 GHz to 29.50 GHz, (ii) a frequency band n258 (often referred to as K-band) having a center frequency of 26 GHz and spanning from 24.25 GHz to 27.50 GHz, (iii) a frequency band n260 (often referred to as Ka-band) having a center frequency of 39 GHz and spanning from 37.00 GHz to 40.00 GHz, and/or (iv) a frequency band n261 (often also referred to as Ka-band) having a center frequency of 28 GHz and spanning from 27.50 GHz to 28.35 GHz. Each of these frequency bands can be divided into two or more constituent carrier components, for example in increments of 50 MHz, 100 MHz, 200 MHz, or 400 MHz.

Although example frequency bands are described above, these are merely illustrative examples. In practice, other frequency bands can be used, either instead of or in addition to those described above. Further, a frequency band can include any range of frequencies (e.g., any bandwidth), including those described above and/or other ranges of frequencies. Further, each frequency band can be divided into any number of carrier components. Further still, each carrier component also can have any range of frequencies (e.g., any bandwidth), including those described above and/or other ranges of frequencies.

As described above, network resources can be dynamically allocated to the electronic devices 102a and 102b to facilitate the exchange of data using the wireless communications links. Accordingly, the electronic devices 102a and 102b can exchange data with one another in a power efficient and network resource efficient manner.

For instance, during periods of high network utilization by the electronic devices 102a and 102b, the system 100 can selectively activate network resources for use by the electronic devices 102a and 102b in exchanging data, such that the electronic devices 102a and 102b can exchange data quickly and/or according to a low latency. As an example, the system 100 can selectively activate one or more additional carrier components for use by the electronic devices 102a and 102b in exchanging data, such that the bandwidth that is allocated for data exchange is increased.

Further, during periods of low network utilization by the electronic devices 102a and 102b, the system 100 can selectively deactivate network resources for use by the electronic devices 102a and 102b in exchanging data, such that the electronic devices 102a and 102b can conserve computational resources and/or power. As an example, the system 100 can selectively deactivate one or more of the carrier components that are (or were) in use by the electronic devices 102a and 102b in exchanging data, such that the bandwidth that is allocated for data exchange is decreased.

Figure 3:
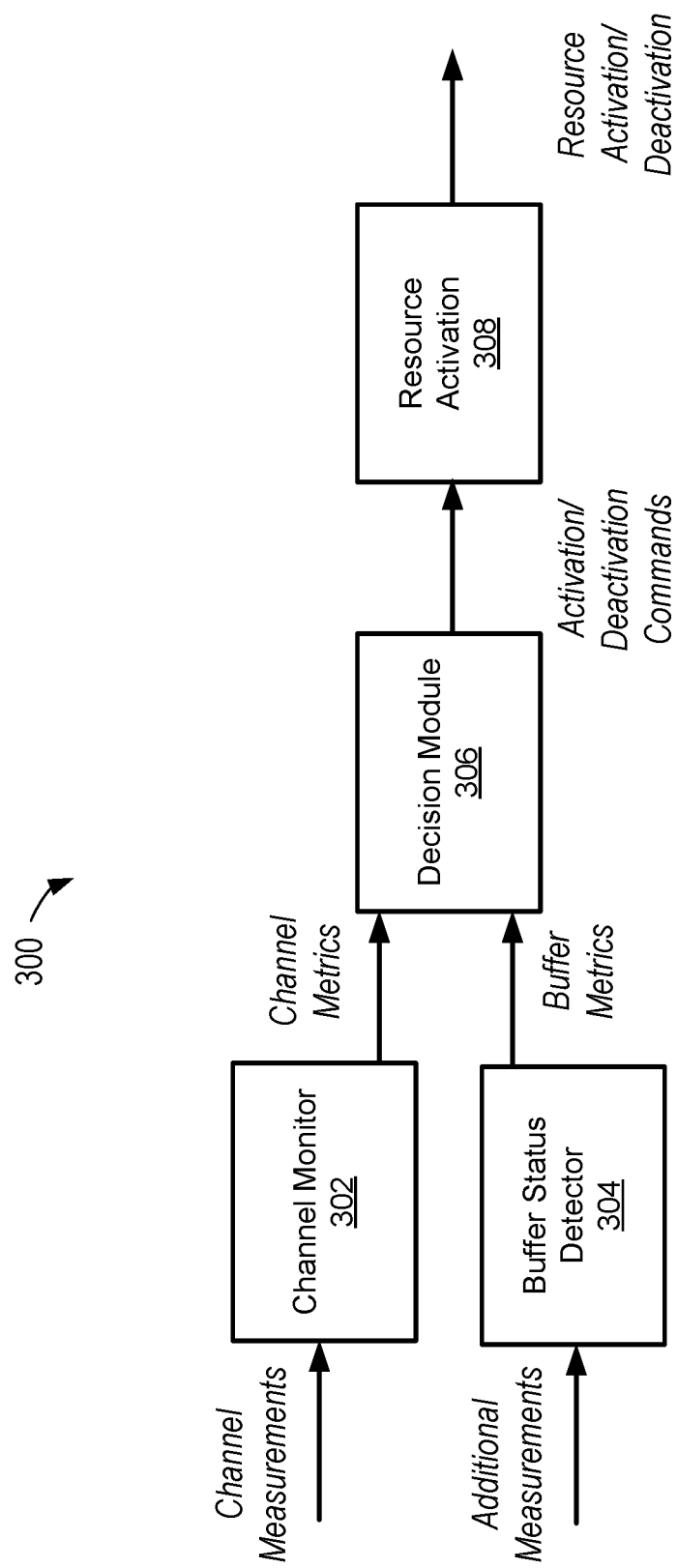
FIG. 3 is a diagram of an example control module for dynamically allocating network resources for exchanging data between electronic devices using a wireless network.

FIG. 3 shows an example control module 300 for dynamically allocating network resources for exchanging data between electronic devices using a wireless network. In some embodiments, the control module 300 can be implemented, at least in part, as a part of the electronic devices 102a and/or 102b. As an example, at least a portion of the control module 300 can be included as a part of the transceiver 104a, the transceiver 104b, and/or other components thereof.

As shown in FIG. 3, the control module 300 includes a channel monitor module 302, a buffer status detector module 304, a decision module 306, and a resource activation module 308.

During an example operation of the control module 300, the channel monitor module 302 obtains measurements of one or more communications channels available to an electronic device in transmitting and/or receiving data from one or more other electronic devices. In some implementations, each channel can correspond to one or more respective carrier components of one or more frequency bands. Further, at least some of the channel measurements can be obtained by a transceiver and/or a modem of the electronic device. In some implementations, at least some of the channel measurements can be obtained from a Channel State Information Reference Signal (CSI-RS) exchanged between the electronics devices.

The channel monitor module 302 generates one or more channel metrics representing the channel measurements, and provides the generated channel metrics to the decision module 306 for further processing. In some implementations, the channels metric can be provided to the decision module 306 in a continuous or recurring basis.

In some implementations, the channel measurements and channel metrics can indicate the quality of one or more communications channels available to the electronic device in transmitting and/or receiving data. As an example, the channel measurements and channel metrics can indicate a signal strength associated with each of the channels, such as a reference signal received power (RSRP). In some implementations, the RSRP of a channel can represent a measurement of the received power level for that channel, such as the average power received by the electronic device from a single reference signal. As further examples, the channel measurements and channel metrics can indicate a Reference Signal Received Quality (RSRQ) for a channel, a Received Signal Strength Indicator (RSSI) for a channel, a signal-to-noise ratio (SNR) for channel, a signal-to-interference-plus-noise ratio (SINK) for a channel, and/or Channel Quality Indicator (CQI) for a channel.

Further, the buffer status detector module 304 obtains additional measurements regarding the exchange data between the electronic device and or more other electronic devices, generates one or more buffer metrics representing a status of a transmission buffer for exchanging data between the electronic device and or more other electronic devices, and provides the generated buffer metrics to the decision module 306 for further processing.

As an example, if data is being transmitted to the electronic device (e.g., a user equipment) from another electronic device (e.g., a base station), the buffer metrics can represent the status of the base station's transmission buffer for transmitting data to the user equipment. As another example, if data is being transmitted from the electronic device (e.g., a user equipment) to another electronic device (e.g., a base station), the buffer metrics can represent the status of the user equipment's transmission buffer for transmitting data to the base station.

In some implementations, the buffer status detector module 304 can be implemented as a part of a first electronic device (e.g., a user equipment), and can infer a status of the transmission buffer of another electronic device (e.g., a base station) based on the additional measurements. As an example, based on the additional measurements, the buffer status detector module 304 of a user equipment can infer whether a base station's transmission buffer for transmitting data to the user equipment meets certain utilization criteria (e.g., indicating that the utilization of the transmission buffer is greater than a particular threshold level), and the length of time during which that transmission buffer meets the utilization criteria. In some implementations, the interval of time during which the transmission buffer meets the utilization criteria may be referred to as a burst duration (e.g., the time during which a "burst" of data is transmitted from one device to another).

In some implementations, the buffer status detector module 304 can determine the burst duration by determining a utilization of the transmission buffer by the transmitting device during each of several time slots. For example, for each of several time slots, the buffer status detector module 304 of a user equipment can determine whether that time slot is "active" (e.g., indicating that the utilization of a base station's transmission buffer for transmitting data to the user equipment during that time slot is sufficiently high), "inactive" (e.g., indicating that the utilization of the base station's transmission buffer for transmitting data to the user equipment during that time slot is not sufficiently high), or "busy" (e.g., indicating that the base station is servicing a device other than the user equipment during that time slot). The burst duration can begin at the first active time slot in a sequence of time slots, and end at the next inactive time slot in that sequence. Further, the burst duration can include any inactive time slots between the first active time slot and the next inactive time slot in that sequence.

Figure 4:
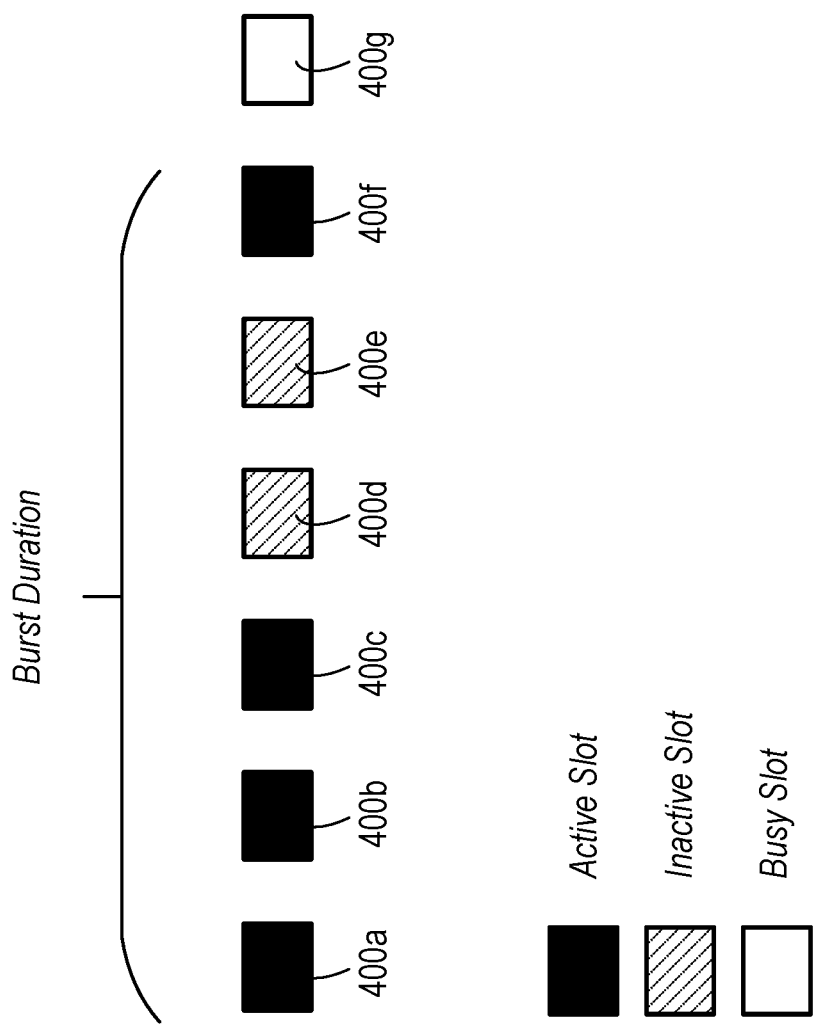
FIG. 4 shows an example sequence of time slots.

As an illustrative example, FIG. 4 shows a sequence of time slots 400a-400g. Based on measurement data obtained by the buffer status detector module 304, the buffer status detector module 304 determines that the time slots 400a-400c and 400f are active time slots, the time slots 400d and 400e are busy time slots, and the time slot 400g is an inactive time slot. Based on these determinations, the buffer status detector module 304 determines that a burst duration extends from the beginning of the time slot 400a to the end of the time slot 400f.

In some implementations, the buffer status detector module 304 can determine whether a time slot is active or inactive based on information regarding a transport block size (TBS) of a data transmission during that time slot, relative to a maximum transport block size ($TBS_{max}$) for the transmission of data (e.g., the largest supported transport block size for transmitting data in accordance with the configuration of the system 100). In some implementations, a transport block size of a data transmission may be calculated in accordance with a relevant communication standard, such as a 3GPP standard.

As example, the buffer status detector module 304 can determine that a time slot is an active time slot if, during that time slot:

$$\frac{TBS}{TBS_{max}} > T, \qquad \text{(Eq. 1)}$$

where T is a threshold value. Further, the buffer status detector module 304 can determine that a time slot is an inactive time slot if, during that time slot:

$$\frac{TBS}{TBS_{max}} \leq T. \qquad \text{(Eq. 2)}$$

In some implementations, T can be 0.5. In practice, other values for T also can be used, depending on the implementation. In some implementations, the value of T can be selected empirically.

In some implementations, a transport block size and maximum transport block size of a data transmission can be determined in accordance with a relevant communication standard, such as in accordance with definitions of these parameters in a 3GPP standard.

In some implementations, the maximum transport block size can be determined as a function of a modulation coding scheme (MCS) index of a wireless communications link between the electronic device and another electronic device, a number of multiple-input and multiple-output (MIMO) layers of that wireless communications link, a number of resource blocks (RBs) associated with that wireless communications link, and/or other information regarding any related configurations and overheads for the wireless communications.

As an example, the buffer status detector module 304 can determine the MCS index based on a Channel Quality Indicator (CQI) of a data transmission during a time slot. Further, the buffer status detector module 304 can determine a maximum supported MCS index based on a table that maps CQI to corresponding modulation and code rates (e.g., as specified in accordance with a relevant standard, such as a 3GPP standard).

As another example, the buffer status detector module 304 can determine the number of MIMO layers based on information obtained from a baseband of the user equipment.

As another example, the buffer status detector module 304 can determine then number of resource blocks based on the maximum number of resource blocks (per slot) that are supported by the current bandwidth. For instance, for bandwidth equal to 100 MHz and subcarrier spacing equal to 120 KHz, the maximum number of resource blocks that can be allocated in a slot is 66.

As another example, the buffer status detector module 304 can determine—configurations and/or overheads associated with the wireless communications based in information obtained from the baseband of the user equipment.

Further, the decision module 306 can determine whether each channel is saturated based on the burst duration for that channel. For example, the buffer status detector module 304 can determine that a channel is saturated if:

$$t_{burst} > t_{threshold} \qquad (\text{Eq. 3}),$$

where $t_{burst}$ is the burst duration for that channel and $t_{threshold}$ is a threshold length of time. Further, the buffer status detector module 304 can determine that a channel is not saturated if:

$$t_{burst} \leq t_{threshold} \qquad (\text{Eq. 4}).$$

In some implementations, $t_{threshold}$ can be 42 milliseconds. In practice, other values for $t_{threshold}$ also can be used, depending on the implementation. The value of $t_{threshold}$ can be selected empirically.

In some implementations, $t_{threshold}$ can be selected based on a machine learning process. As an example, a machine learning system (e.g., a neural network) can be trained using training data representing several data transmissions between electronic devices. The training data can indicate, for each data transmission, (i) a burst duration of that data transmission, and (ii) whether that burst transmission had saturated the channels and/or carrier components allotted for transmitting that data. Based on this training data, the machine learning system can determine a value for $t_{threshold}$ that distinguishes saturated channels and/or carrier components from unsaturated channels and/or carrier components. In turn, determined value for $t_{threshold}$ can be used to determining whether a newly observed burst duration is indicative of a saturated channel and/or carrier component or a non-saturated channel and/or carrier component.

As described above, the buffer status detector module 304 generates buffer metrics based on the obtained measurements, and provides the buffer metrics to the decision module 306 for further processing. As an example, the buffer metrics can indicate whether each channel is saturated or saturated. In some implementations, the buffer metric can be provided to the decision module 306 in a continuous or recurring basis.

The decision module 306 receives the channel metrics from the channel monitor module 302 and the buffer metrics from the buffer status detector module 304, and based on the received metrics, determines whether to dynamically adjust an allotment of network resources for transmitting data between the electronic devices.

As an example, if the buffer metrics determines that N or more of the currently active communications channels are saturated (e.g., the burst durations for those channel are greater than a threshold length of time), the buffer status detector module 304 can determine that additional network resources (e.g., one or more additional carrier components) can be allotted for exchanging data.

As an example, if the buffer metrics determines that M or more of the currently active communications channels are not saturated (e.g., the burst durations for those channel are less than or equal to a threshold length of time), the buffer status detector module 304 can determine that network resources (e.g., one or more active carrier components) can be de-allocated for exchanging data.

The values of N and M can vary, depending on the implementation. As an example, in some implementations, the values of N and M can each be equal to the total number of currently active channels and/or carrier components. For example, if the buffer metrics indicate that all of the currently active channels and/or carrier components are saturated, the buffer status detector module 304 can determine that one or more additional carrier components can be activated for exchanging data. Further, if the buffer metrics indicate that all of the currently active channels and/or carrier components are not saturated, the buffer status detector module 304 can determine that one or more of the active carrier components can be deactivated. Otherwise, the buffer status detector module 304 can determine that the currently active carrier components can be maintained without adjustment.

In some implementations, value of N and/or the value of M can be less than the total number of currently active channels and/or carrier components. In some implementations, the value of N and/or the value of M can be selected empirically.

In some implementations, the buffer status detector module 304 can select one or more carrier components for activation based on a signal quality associated with each of the carrier components. As an example, upon determining that an additional carrier components can be activated, the buffer status detection module 304 can select, from among the currently deactivated carrier components, the carrier component having the highest signal quality. This can be beneficial, for example, in improving the reliability and/or performance of the data transmission (e.g., by prioritizing the selection of carrier components that are more likely to perform well under the current conditions).

As another example, upon determining that currently active carrier components can be deactivated, the buffer status detection module 304 can select, from among the currently activated carrier components, the carrier component having the lowest signal quality. This also can be beneficial, for example, in improving the reliability and/or performance of the data transmission (e.g., by prioritizing the deactivation of carrier components that are less likely to perform well under the current conditions).

In some implementations, the buffer status detector module 304 can determine the signal quality for each carrier component based, at least in part, on the channel measurements obtained by the channel monitor module 302. As an example, a high RSRP, RSRQ, RSSSI, SNR, SINR, and/or CQI can be indicative of high signal quality, whereas a low RSRQ, RSSSI, SNR, SINR, and/or CQI can be indicative of low signal quality. In some implementations, the buffer status detector module 304 can rank each of the carrier components relative to one another based on RSRP, RSRQ, RSSSI, SNR, SINR, and/or CQI.

In some implementations, the buffer status detector module 304 can determine the signal quality for each carrier component based on a weighted moving average of one or more of the channel metrics, such as on a continuous or periodic basis. For example, the buffer status detector module 304 can determine the signal quality of a carrier component using the function:

$$RSRP_{WMA}(i)=(1-a)*RSRP_{WMA}(i-1)+alpha*RSRP(i) \quad \text{(Eq. 5),}$$

where RSRP(i) is a measurement RSRP of the carrier component at a time index i, $RSRP_{WMA}(i)$ is a weighted moving average of the carrier component at the time index i, and a is a weighting coefficient. In some implementations, weighting coefficient a can be 1.8. In practice, other values for the weighting coefficient a also can be used, depending on the implementation. In some implementations, the weighting coefficient a can be selected empirically.

The decision module 306 generates activation and/or deactivation commands, and provides the commands to the resource activation module 308 for execution. For example, the decision module 306 can identify one or more carrier components for activation (e.g., using the techniques described herein), and instruct the resource activation module 308 to activate those carrier components. As another example, the decision module 306 can identify one or more currently active carrier components for deactivation (e.g., using the techniques described herein), and instruct the resource activation module 308 to deactivate those carrier components.

In some implementations, the resource activation module 308 can inform other electronic devices regarding the activation and/or deactivation of network resources. For example, if the control module 300 is implemented on a user equipment, the resource activation module 308 can transmit a message to a base station (e.g., a base station transmitting data to the user equipment) notifying the base station of the activation and/or deactivation of network resources for transmitting data between them.

In some implementations, the resource activation module 308 of a user equipment can notify the base station of a deactivation of a particular carrier component by transmitting a Channel Quality Indicator (CQI) having a preselected value or range of values (e.g., 0) for that carrier component. Further, the resource activation module 308 of the user equipment can notify the base station of an activation of a particular carrier component by transmitting a Channel Quality Indicator (CQI) having another preselected value or range of values (e.g., a value greater than zero) for that carrier component. This can be beneficial, for example, in enabling the resource activation module 308 to signal, to the base station, the activation and/or deactivation of network resources using pre-existing reporting and/or measurement protocols between them.

In some implementations, the resource activation module 308 of a user equipment can notify the base station of a deactivation of a particular carrier component in accordance with a relevant technical standard, such as in accordance with 3GPP Release UE Assistance Information (UAI) with Reduced MAXCCs (e.g., as described in 3GPP, NR, Release 15, Section 5.7.4.1 to 5.7.4.3, the contents of which are incorporated into this disclosure by reference). For example, the user equipment can transmit a UEAssistanceInformation" message to the base station, and include in the message a reducedMaxCC indicating that one or more carrier components are to be deactivated.

Figure 5:
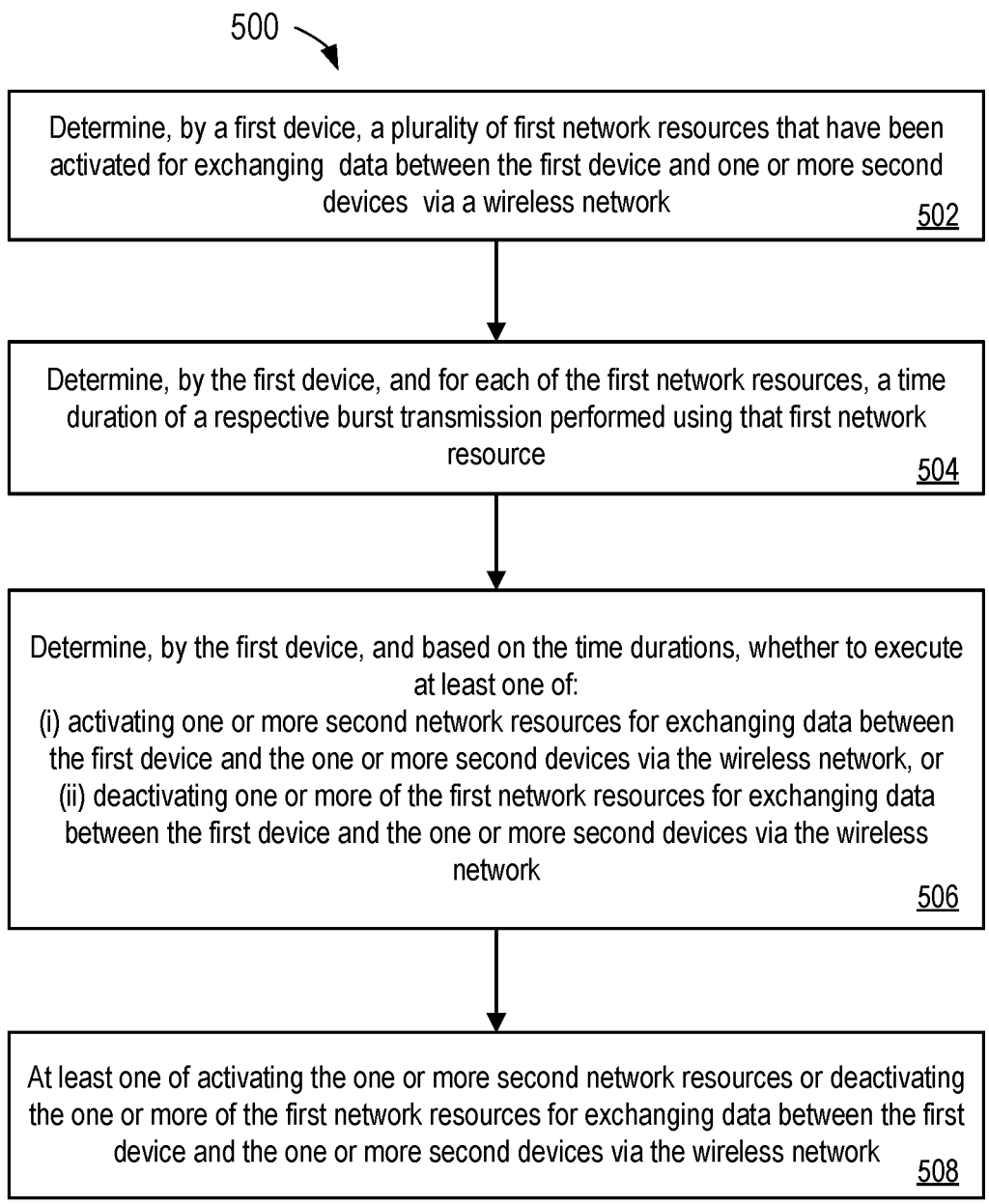
FIG. 5 is a flow chart diagram of an example process for dynamically allocating network resources for exchanging data using wireless networks.

FIG. 5 shows an example process 500 for dynamically allocating network resources for exchanging data using wireless networks. The process 500 can be performed for example, one or more of the components of the system 100 shown in FIG. 1 (e.g., the first electronic device 102a and/or the second electronic device 102b) using the techniques described herein. In some implementations, process 500 can be performed at least in part by a control module 300 (e.g., as shown in FIG. 3) that is included in one or more of the electronic devices (e.g., included in a transceiver of an electronic device and/or some other component thereof).

In the process 500, a first device determines a plurality of first network resources that have been activated for exchanging data between the first device and one or more second devices via a wireless network (block 502). In some implementations, the first device can include a user equipment (UE) of the wireless network. Further, each of the one or more second devices can include a respective base station (BS) of the wireless network. Examples of the first and second devices are shown and described with reference to FIG. 1.

In some implementations, the first network resources and the one or more second network resources can include a plurality of carrier components (CCs) for exchanging data via the wireless network. Each of the carrier component can include, for example, one or more respective portions of one or more frequency bands. Example carrier components and frequency band are shown and described with reference to FIG. 2.

Further, the first device determines, for each of the first network resources, a time duration of a respective burst transmission performed using that first network resource (block 504). Example techniques for determining a time duration of a burst transmission are described, for instance, with reference to FIG. 4.

Further, the first device determines, based on the time durations, whether to execute (i) activating one or more second network resources for exchanging data between the first device and the one or more second devices via the wireless network, and/or (ii) deactivating one or more of the first network resources for exchanging data between the first device and the one or more second devices via the wireless network. Example techniques for making this determination are described, for instance, with reference to FIG. 3.

In some implementations, this determination can be performed, at least on part by, determining (i) a first count of the first network resources that satisfy one or more saturation criteria and/or (ii) a second count of the first network resources that do not satisfy the one or more saturation criteria. Determining whether a first network resource satisfies the one more saturation criteria can include determining whether the time duration of the burst transmission performed using that first network resource exceeds a threshold time duration.

Further, the first device activates the one or more second network resources and/or deactivates the one or more of the first network resources for exchanging data between the first device and the one or more second devices via the wireless network. Example techniques for activation and/or deactivating network resources are described, for instance, with reference to FIG. 3.

In some implementations, the one or more second network resources can be activated based on a determination that the first count is greater than or equal to a threshold value N. In some implementations, the threshold value N can be equal to a number of the first network resources (e.g., equal to the total number of the first network resources that are currently active for exchanging data between the electronic devices). In some implementations, the threshold value N can be less than a number of the first network resources (e.g., less than the total number of the first network resources that are currently active for exchanging data between the electronic devices).

In some implementations, activating the one or more second network resources can include determining, for each of a plurality of candidate network resources, a corresponding quality metric for that candidate network resource. Further, the one or more second network resources can be selected from the plurality of candidate network resources based on the quality metrics. As examples, quality metrics for a candidate network resource can include a reference signal received power (RSRP) associated with that candidate network resource, a signal to noise ratio (SNR) associated with that candidate network resource, and/or a channel quality indicator (CQI) associated with that candidate network resource.

In some implementations, the one or more first network resources can be deactivated based on a determination that the second count is greater than or equal to a threshold value M. In some implementations, deactivating the one or more first network resources comprises can include determining, for each of the first network resources, a corresponding quality metric for that first network resource. Further, the one or more first network resources can be selected based on the quality metrics. As examples, quality metrics for a first network resource can include a reference signal received power (RSRP) associated with that first network resource, a signal to noise ratio (SNR) associated with that first network resource, and/or a channel quality indicator (CQI) associated with that first network resource.

Figure 6:
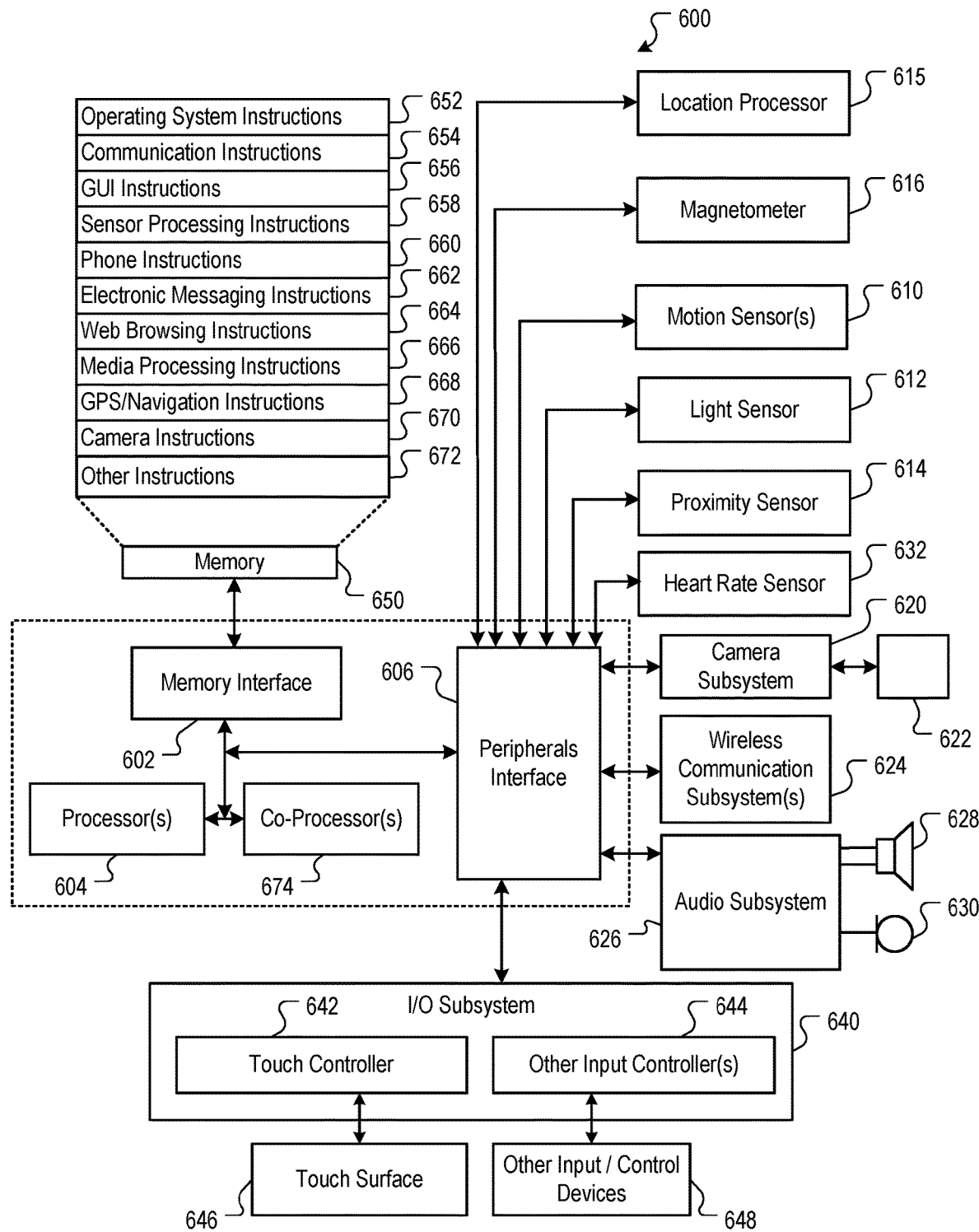
FIG. 6 is a block diagram of an example architecture for implementing the features and processes described in reference to FIGS. 1-5.

FIG. 6 is a block diagram of an example device architecture 600 for implementing the features and processes described in reference to FIGS. 1-5. For example, the architecture 600 can be used to implement the first electronic device 102a and/or the second electronic device 102b. Architecture 600 may be implemented in any device for generating the features described in reference to FIGS. 1-5, including but not limited to desktop computers, server computers, portable computers, smart phones, tablet computers, game consoles, wearable computers, set top boxes, media players, smart TVs, and the like.

The architecture 600 can include a memory interface 602, one or more data processor 604, one or more data co-processors 674, and a peripherals interface 606. The memory interface 602, the processor(s) 604, the co-processor(s) 674, and/or the peripherals interface 606 can be separate components or can be integrated in one or more integrated circuits. One or more communication buses or signal lines may couple the various components.

The processor(s) 604 and/or the co-processor(s) 674 can operate in conjunction to perform the operations described herein. For instance, the processor(s) 604 can include one or more central processing units (CPUs) that are configured to function as the primary computer processors for the architecture 600. As an example, the processor(s) 604 can be configured to perform generalized data processing tasks of the architecture 600. Further, at least some of the data processing tasks can be offloaded to the co-processor(s) 674. For example, specialized data processing tasks, such as processing motion data, processing image data, encrypting data, and/or performing certain types of arithmetic operations, can be offloaded to one or more specialized co-processor(s) 674 for handling those tasks. In some cases, the processor(s) 604 can be relatively more powerful than the co-processor(s) 674 and/or can consume more power than the co-processor(s) 674. This can be useful, for example, as it enables the processor(s) 604 to handle generalized tasks quickly, while also offloading certain other tasks to co-processor(s) 674 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 604 for further analysis.

Sensors, devices, and subsystems can be coupled to peripherals interface 606 to facilitate multiple functionalities. For example, a motion sensor 610, a light sensor 612, and a proximity sensor 614 can be coupled to the peripherals interface 606 to facilitate orientation, lighting, and proximity functions of the architecture 600. For example, in some implementations, a light sensor 612 can be utilized to facilitate adjusting the brightness of a touch surface 646. In some implementations, a motion sensor 610 can be utilized to detect movement and orientation of the device. For example, the motion sensor 610 can include one or more accelerometers (e.g., to measure the acceleration experienced by the motion sensor 610 and/or the architecture 600 over a period of time), and/or one or more compasses or gyros (e.g., to measure the orientation of the motion sensor 610 and/or the mobile device). In some cases, the measurement information obtained by the motion sensor 610 can be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 610 can be directly integrated into a co-processor 674 configured to processes measurements obtained by the motion sensor 610. For example, a co-processor 674 can include one more accelerometers, compasses, and/or gyroscopes, and can be configured to obtain sensor data from each of these sensors, process the sensor data, and transmit the processed data to the processor(s) 604 for further analysis.

Other sensors may also be connected to the peripherals interface 606, such as a temperature sensor, a biometric sensor, or other sensing device, to facilitate related functionalities. As an example, as shown in FIG. 6, the architecture 600 can include a heart rate sensor 632 that measures the beats of a user's heart. Similarly, these other sensors also can be directly integrated into one or more co-processor(s) 674 configured to process measurements obtained from those sensors.

A location processor 615 (e.g., a GNSS receiver chip) can be connected to the peripherals interface 606 to provide geo-referencing. An electronic magnetometer 616 (e.g., an integrated circuit chip) can also be connected to the peripherals interface 606 to provide data that may be used to determine the direction of magnetic North. Thus, the electronic magnetometer 616 can be used as an electronic compass.

A camera subsystem 620 and an optical sensor 622 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 624. The communication subsystem(s) 624 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 624 can depend on the communication network(s) or medium(s) over which the architecture 600 is intended to operate. For example, the architecture 600 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 600 can be configured as a base station for other wireless devices. As another example, the communication subsystems may allow the architecture 600 to synchronize with a host device using one or more protocols, such as, for example, the TCP/IP protocol, HTTP protocol, UDP protocol, and any other known protocol.

An audio subsystem 626 can be coupled to a speaker 628 and one or more microphones 630 to facilitate voice-enabled functions, such as voice recognition, voice replication, digital recording, and telephony functions.

An I/O subsystem 640 can include a touch controller 642 and/or other input controller(s) 644. The touch controller 642 can be coupled to a touch surface 646. The touch surface 646 and the touch controller 642 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 646. In one implementations, the touch surface 646 can display virtual or soft buttons and a virtual keyboard, which can be used as an input/output device by the user.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In some implementations, the architecture 600 can present recorded audio and/or video files, such as MP3, AAC, and MPEG video files. In some implementations, the architecture 600 can include the functionality of an MP3 player and may include a pin connector for tethering to other devices. Other input/output and control devices may be used.

A memory interface 602 can be coupled to a memory 650. The memory 650 can include high-speed random access memory or non-volatile memory, such as one or more magnetic disk storage devices, one or more optical storage devices, or flash memory (e.g., NAND, NOR). The memory 650 can store an operating system 652, such as Darwin, RTXC, LINUX, UNIX, OS X, WINDOWS, or an embedded operating system such as VxWorks. The operating system 652 can include instructions for handling basic system services and for performing hardware dependent tasks. In some implementations, the operating system 652 can include a kernel (e.g., UNIX kernel).

The memory 650 can also store communication instructions 654 to facilitate communicating with one or more additional devices, one or more computers or servers, including peer-to-peer communications. The communication instructions 654 can also be used to select an operational mode or communication medium for use by the device, based on a geographic location (obtained by the GPS/Navigation instructions 668) of the device. The memory 650 can include graphical user interface instructions 656 to facilitate graphic user interface processing, including a touch model for interpreting touch inputs and gestures; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 669 to facilitate GPS and navigation-related processes; camera instructions 670 to facilitate camera-related processes and functions; and other instructions 672 for performing some or all of the processes described herein.

Each of the above identified instructions and applications can correspond to a set of instructions for performing one or more functions described herein. These instructions need not be implemented as separate software programs, procedures, or modules. The memory 650 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks;

magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A user equipment (UE) device comprising:
one or more processors; and
memory storing instructions that when executed by the one or more processors, cause the one or more processors to perform operations comprising:
  determining, by the UE device, a plurality of first network resources that have been activated for exchanging data between the UE device and one or more second devices via a wireless network;
  determining, by the UE device, and for each of the first network resources, a time duration of a respective burst transmission performed using that first network resource;
  determining, by the UE device, and based on the time durations, whether to execute at least one of:
    (i) activating one or more second network resources for exchanging data between the UE device and the one or more second devices via the wireless network, or
    (ii) deactivating one or more of the first network resources for exchanging data between the UE device and the one or more second devices via the wireless network; and
  at least one of activating the one or more second network resources or deactivating the one or more of the first network resources for exchanging data between the UE device and the one or more second devices via the wireless network.

2. The UE device of claim 1, wherein each of the one or more second devices comprises a respective base station (BS) of the wireless network.

3. The UE device of claim 1, wherein the first network resources and the one or more second network resources comprise a plurality of carrier components (CCs) for exchanging data via the wireless network.

4. The UE device of claim 1, wherein determining whether to execute at least one of (i) activating the one or more second network resources, or (ii) deactivating the one or more of the first network resources comprises:
determining, based on the time durations:
  a first count of the first network resources that satisfy one or more saturation criteria, and
  a second count of the first network resources that do not satisfy the one or more saturation criteria.

5. The UE device of claim 4, wherein, for each of the first network resources, determining whether that first network resources satisfies the one or more saturation criteria comprises:
determining whether the time duration of the burst transmission performed using that first network resource exceeds a threshold time duration.

6. The UE device of claim 4, wherein at least one of:
the one or more second network resources are activated based on a determination that the first count is greater than or equal to a threshold value N, or
the one or more first network resources are deactivated based on a determination that the second count is greater than or equal to a threshold value M.

7. The UE device of claim 6, wherein the threshold value N is one of:
equal to a number of the first network resources, or
less than a number of the first network resources.

8. The UE device of claim 1, wherein activating the one or more second network resources comprises:
- determining, for each of a plurality of candidate network resources, a corresponding quality metric for that candidate network resource, and
- selecting the one or more second network resources from the plurality of candidate network resources based on the quality metrics.

9. The UE device of claim 8, wherein, for each of the candidate network resources, the quality metric of that candidate network resource represents at least one of:
- a reference signal received power (RSRP) associated with that candidate network resource,
- a signal to noise ratio (SNR) associated with that candidate network resource, or
- a channel quality indicator (CQI) associated with that candidate network resource.

10. The UE device of claim 1, wherein deactivating the one or more first network resources comprises:
- determining, for each of the first network resources, a corresponding quality metric for that first network resource, and
- selecting the one or more first network resources based on the quality metrics.

11. One or more processors configured to perform operations comprising:
- determining a plurality of first network resources that have been activated for exchanging data between a first device and one or more second devices via a wireless network;
- determining, for each of the first network resources, a time duration of a respective burst transmission performed using that first network resource;
- determining, based on the time durations, whether to execute at least one of:
  - (i) activating one or more second network resources for exchanging data between the first device and the one or more second devices via the wireless network, or
  - (ii) deactivating one or more of the first network resources for exchanging data between the first device and the one or more second devices via the wireless network; and
- at least one of activating the one or more second network resources or deactivating the one or more of the first network resources for exchanging data between the first device and the one or more second devices via the wireless network.

12. The one or more processors of claim 11, wherein the first device comprises a user equipment (UE) of the wireless network, and
- wherein each of the one or more second devices comprises a respective base station (BS) of the wireless network.

13. The one or more processors of claim 11, wherein the first network resources and the one or more second network resources comprise a plurality of carrier components (CCs) for exchanging data via the wireless network.

14. The one or more processors of claim 11, wherein determining whether to execute at least one of (i) activating the one or more second network resources, or (ii) deactivating the one or more of the first network resources comprises:
- determining, based on the time durations:
  - a first count of the first network resources that satisfy one or more saturation criteria, and
  - a second count of the first network resources that do not satisfy the one or more saturation criteria.

15. The one or more processors of claim 14, wherein, for each of the first network resources, determining whether that first network resources satisfies the one or more saturation criteria comprises:
- determining whether the time duration of the burst transmission performed using that first network resource exceeds a threshold time duration.

16. The one or more processors of claim 14, wherein at least one of:
- the one or more second network resources are activated based on a determination that the first count is greater than or equal to a threshold value N, or
- the one or more first network resources are deactivated based on a determination that the second count is greater than or equal to a threshold value M.

17. The one or more processors of claim 16, wherein at least one of:
- the threshold value N is equal to a number of the first network resources, or
- the threshold value N is less than a number of the first network resources.

18. The one or more processors of claim 11, wherein activating the one or more second network resources comprises:
- determining, for each of a plurality of candidate network resources, a corresponding quality metric for that candidate network resource, and
- selecting the one or more second network resources from the plurality of candidate network resources based on the quality metrics.

19. The one or more processors of claim 18, wherein, for each of the candidate network resources, the quality metric of that candidate network resource represents at least one of:
- a reference signal received power (RSRP) associated with that candidate network resource,
- a signal to noise ratio (SNR) associated with that candidate network resource, or
- a channel quality indicator (CQI) associated with that candidate network resource.

20. The one or more processors of claim 11, wherein deactivating the one or more first network resources comprises:
- determining, for each of the first network resources, a corresponding quality metric for that first network resource, and
- selecting the one or more first network resources based on the quality metrics,
- a channel quality indicator (CQI) associated with first second network resource.

* * * * *